United States Patent [19]

Yoshino et al.

[11] Patent Number: 4,695,144
[45] Date of Patent: Sep. 22, 1987

[54] DRIVE APPARATUS OF LENS AND EXPOSURE MECHANISM BY MOTOR

[75] Inventors: Tsunemi Yoshino, Nara; Katsuji Ishikawa, Higashiosaka; Hiroshi Iwata, Ikoma, all of Japan

[73] Assignee: West Electric Company, Ltd., Osaka, Japan

[21] Appl. No.: 899,914

[22] Filed: Aug. 25, 1986

[30] Foreign Application Priority Data

Aug. 4, 1985 [JP] Japan ................. 60-186132
Aug. 24, 1985 [JP] Japan ................. 60-186131

[51] Int. Cl.⁴ .............................................. G03B 1/18
[52] U.S. Cl. ........................... 354/195.11; 354/271.1; 354/400
[58] Field of Search ................ 354/195.1, 195.11, 400, 354/421, 271.1

[56] References Cited

U.S. PATENT DOCUMENTS

| 4,041,512 | 8/1977 | Iwata et al. .............. 354/234.1 |
| 4,141,636 | 2/1979 | Shimojima ............. 354/195.11 |
| 4,472,039 | 9/1984 | Iwata et al. .............. 354/271.1 |
| 4,491,396 | 1/1985 | Isobe et al. ............ 354/400 X |
| 4,589,753 | 5/1986 | Kawai .................. 354/195.1 X |

Primary Examiner—L. T. Hix
Assistant Examiner—Brian W. Brown
Attorney, Agent, or Firm—Cushman, Darby & Cushman

[57] ABSTRACT

Driving of camera lens (5) and driving of exposure mechanism (9) (shutter/aperture blades) are driven by a single motor (7) wherein a main body of exposure mechanism is affixed to the lens barrel, and a drive member (10) of the exposure mechanism (9) is slidably engaged to a sliding guide pin (11); and by selecting friction force between a hollow threaded driving member (1) and the threaded outer face of the lens burrel (4) appropriately, the exposure mechanism (9) can be driven through the friction force.

14 Claims, 11 Drawing Figures

DRIVE APPARATUS OF LENS AND EXPOSURE MECHANISM BY MOTOR

FIELD OF THE INVENTION AND RELATED ART STATEMENT

1. Field of the Invention

This invention relates to a drive apparatus of lens and aperture or exposure mechanism for working as aperture shutter in an optical lens apparatus used in photographic camera or the like, and more particularly to a drive apparatus of lens and exposure mechanism for driving both lens and exposure mechanism by a single motor.

2. Description of the Related Art

Conventionally, various drive apparatuses using motor have been known as the drive source for controlling the moving operation of the lens and aperture of exposure mechanism working as aperture shutter in the optical lens apparatus such as photographic camera.

For example, the apparatus to drive the lens by motor is disclosed in U.S. Pat. No. 4,491,396 and others; the apparatus to drive the aperture by motor, in U.S. Pat. No. 4,472,039 and others, and the apparatus do drive the aperture shutter in U.S. Pat. No. 4,041,512 and others.

All these prior arts are to use a direct-current motor or a stepping motor, and disclose the technical concept to control the movement of the lens, aperture or aperture shutter, by the normal and reverse rotations of the rotary shaft and rotor by coupling the rotary shaft of the DC motor with lens moving mechanism, or the rotor of stepping motor with drive member of aperture or aperture shutter.

However, if application to an actual camera apparatus, they have such problems there at least two motors are necessary for moving the lens and for moving the aperture or aperture shutter, and that installing positions and independent control circuits of individual motors are required further, and hence, resulting in complicated structure and larger size.

OBJECT AND SUMMARY OF THE INVENTION

It is a primary object of this invention to present a drive apparatus of lens and exposure mechanism which can control the movement of lens and aperture, or lens and aperture by a single motor, in consideration of the above-discussed probloems.

BRIEF DESCRIPTION OF THE DRAWINGS

FIG. 6 (a), (b), and FIG. 7 (a) to (d) are perspective views or schematic sectional views showing other examples having an equivalent function as the stopping mechanism represented by reference number 17 in FIG. 5.

DETAILED DESCRIPTION OF THE INVENTION

Figure 1:
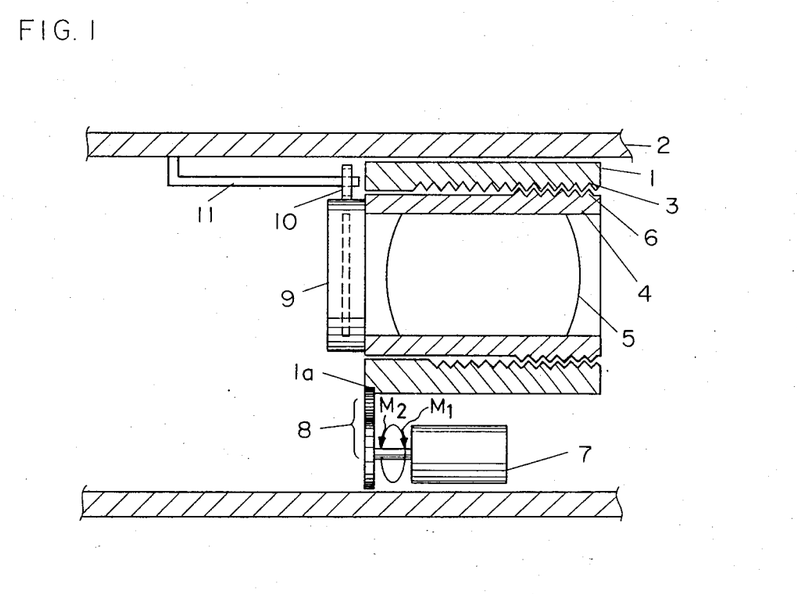
FIG. 1 is a sectional view of essential parts, including a partial side elevation, showing an embodiment of a drive apparatus of lens and exposure mechanism by motor based on this invention.

FIG. 1 is a sectional view of essential parts, including a partial side elevation, showing an embodiment of the drive apparatus according to the present invention, which is, as clear from the description hereunder, an example of controlling the movement of lens and exposure mechanism acting as aperture by a single motor which can rotate both normally and reversely.

In the drawing, a rotary member 1 of a hollow drawn shape has, inside thereof, a first threaded part 3 to constitute a part of a converting means to convert a rotary motion into a linear motion with respect to a frame 2. Such rotary member 1 is provided in an optical lens apparatus, in a manner to be rotatable but non-slidable in the lateral direction of FIG. 1.

A lens barrel 4 which holds a lens 5 has a second threaded part 6, thereby to constitute the above-mentioned converting means by engagement with said first threaded part 3 in its outer side.

A motor 7 is provided as a drive source and can rotate in both normal and reverse directions, and a gear train 8 is provided to the motor 7 as a transmission means to transmit the rotating force of the motor 7 to the rotary member 1 through an outer gear 1a provided in part of the outer circumference of the rotary member 1. In this embodiment, this gear train 8 is configurated so as to control the transmission of said rotating force in such a manner that the rotating direction of the rotary member 1 may be identical with that of the motor 7.

Figure 2:
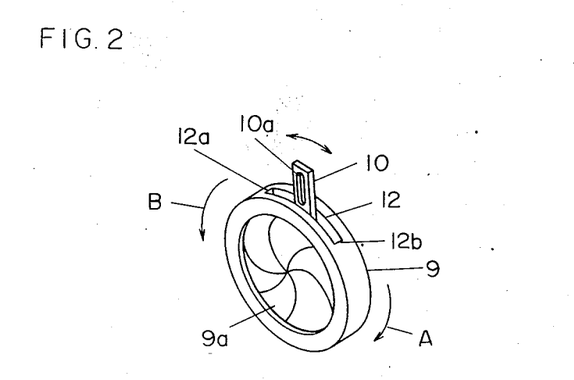
FIG. 2 is a perspective view of a known aperture mechanism as exposure mechanism represented by reference number 9 in FIG. 1.

A known aperture mechanism 9 as exposure mechanism is fixed to the lens barrel 4 and has plural blades 9a which are open-closed operated or exposure members provided inside, as shown in the perspective view of FIG. 2, by the movement in the directions of arrows A and B of a drive member 10 projected outside of its main body, and the main body is affixed to the lens barrel 4.

A projection pin 11 is affixed to the frame 2 and extending in the direction parallel to the optical axis. The projection pin 11 is slidably engaging to aperture drive member 10 by insertion into a groove 10a of the latter, so as to make the drive member 10 slidable freely in the direction of optical axis of the lens 5 and be engaged in the rotating direction around of the optical axis.

When the motor 7 is driven by a drive control circuit (not shown) in a direction of arrow $M_1$ to generate a driving force, this driving force is transmitted to the rotary member 1 by way of gear train 8 and gear part 1a. This driving force is further transmitted to the lens barrel 4 and the aperture mechanism 9 as the exposure mechanism, by way of the first threaded part 3 and second threaded part 6.

Incidentally, between the first threaded part 3 and second threaded part 6, needless to say, there is a certain frictional force, and the drive member 10 can move within the moving groove 12. Therefore, when the driving force of the motor 7 is supplied to the rotary member 1, first the lens barrel 4 and aperture mechanism 9 are put in rotation in the same direction as the rotary member 1. That is, referring to the aperture mechanism 9, its main body rotates in the direction of arrow A in FIG. 2. As a result of this movement, the moving action of the drive member 10 reaches the left side end 12a of the moving groove 12.

When the drive member 10 reaches the left side end 12a of the moving groove 12, the aperture mechanism 9 including this drive member 10 and the lens barrel 4 can no longer rotate in the same direction as the rotary member 1. And hence, after this point, the driving force of the motor 7 is supplied to the lens barrel 4 by way of the first and second threaded parts 3, 6.

Therefore, the lens barrel 4 begins to move, along with the rotation of the motor 7, depending on the relation of the first and second threaded parts, 3, 6, for example, in the leftward direction in FIG. 1 along its optical axis. At the same time, the aperture mechanism 9 also moves in the direction of optical axis. Since the drive member 10 is slidable on the projection pin 11 in the direction of the optical axis. In order to assure freely sliding movement of the drive member 10, the length of the projection pin 11 is made sufficiently long in optical direction.

So, by detecting the position of the lens barrel 4 by a known encoder technology or detecting its drive amount by using a stepping motor as the motor 7, the moving action of the lens 5 held by the lens barrel 4 can be stopped at a right position. That is, the rotation of the motor 7 is stopped, when the result of the position detection shows that the lens barrel 4 has reached a specified position based on a signal from, for example, an auto focus device (not shown).

In this state, when the motor 7 is rotated in the reverse direction ($M_2$) to the above, in the similar manner as the aforementioned operation of the normal direction, the driving force of the motor 7 is first transmitted to the rotary member 1 by way of the gear train 8, and is simultaneously sent to the lens barrel 4 and aperture mechanism 9, through engagement of the first and second threaded parts 3, 6.

That is, first, the lens barrel 4 and aperture mechanism 9 are about to be rotated in the same direction as the rotary member 1 on the spot, that is, without moving in the direction of optical axis, by the frictional force of the first and second threaded parts 3, 6. This rotation is in the direction of arrow B in FIG. 2. Such state is made when the drive member 10 has been driven to the left side end 12a of the moving groove 12. Accordingly, with respect to the drive member 10 linked with the projection pin 11, since this projection pin 11 acts as a fulcrum, the direction of movement is toward the right side end 12b of the moving groove 12, contrary to the aforementioned normal direction movement.

Let us provide that the aperture mechanism is made in a manner that the blades 9a may be fully closed when the position of the drive member 10 with respect to the moving groove 12 is at the left side end 12a and they are fully opened when the drive member 10 is at the right side end 12b. Then, any desired value of aperture may be set by properly controlling the extent of reverse direction rotary action after the moving action of the lens barrel 4 by the motor 7, basing on the signal from an exposure control device or the like (not shown). That is, by controlling the rotary action within the range of moving from the left side end 12a to the right side end 12b of the moving groove 12 of the drive member, desired control is effected in this embodiment.

As mentioned above, since the moving action of the lens 5 and blades 9a can be controlled in desired position by the normal and reverse rotation of the motor 7, a photographic action may take place by subsequent shutter control operations.

In this invention, needless to say, it is required to set the lens barrel 4 at the nearest point side or farthest point side of the lens motion range, as the start point of movement.

Meanwhile, instead of the above description having the aperture mechanism 9 in fully closed state when moving, the lens barrel 4 may be moved in fully open state, and thereafter operate the aperture to the closing direction by changing over the rotating direction of the motor 7.

Further, instead of providing the motor in an optical lens unit as above-illustrated embodiment, the motor may be positioned inside the main body, of a photographic camera, to supply the driving force of the motor to the rotary member 1 through a proper transmission means.

Furthermore, instead of the above configuration that the rotary member 1 is shaped hollow, the rotary member may be in other shape. When necessary range of the travel of the lens barrel 4 in the direction of optical axis is not so long. For instance, as far as the first threaded part 3 and gear part 1a are present, the shape may be semicircular or others.

Below is described concerning a returning to the initial state shown in FIG. 1 from the state where desired control of the lens and aperture has been made as a result of the above-mentioned action.

After completion of proper shutter operation after setting of the lens and aperture, the motor 7 is rotated in the aforementioned controlling direction of the aperture mechanism 9. Then, the drive member 10 reaches the right side end 12b of the moving groove 12, and thereafter the aperture mechanism 9 can no longer proceed even though the rotary member 1 is driven.

Consequently, the driving force by the rotation of the motor 7 overcomes the frictional force between the first and second threaded parts 3 and 6, to move the lens barrel 4 along the optical axis in the reverse direction of the above setting action, that is, in the rightward direction. And by detecting the state in FIG. 1 in a certain method and by controlling the rotation of the motor 7 basing on the detection result, the moving apparatus of this invention may be returned to the initial state in FIG. 1. In such example, the returning action to the state in FIG. 1 is done with the fully open state of the blades 9a, and a known shuttering means is provided besides the aperture mechanism.

Figure 3:
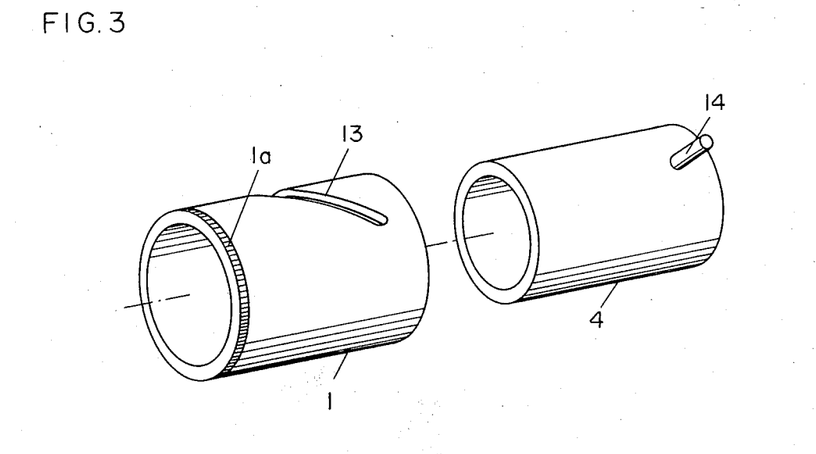
FIG. 3 is a partly disassembled perspective view showing other embodiment of rotary member and lens barrel represented by reference numbers 1 and 4 in FIG. 1.

FIG. 3 is a partially disassembled perspective view showing a different embodiment of rotary member 1 and lens barrel 4 in FIG. 1. As clear from FIG. 3, this embodiment utilizes a known cam and helical groove configuration for converting the rotary movement of the rotary member 1 into a linear movement in the direction of optical axis of the lens barrel 4.

That is, in the embodiment shown in FIG. 3, the rotary member 1 comprises a cam groove 13, and a cam pin 14 to slide within said cam groove 13 is disposed on the outer side of the lens barrel 4.

Besides, similar to the configuration of the aforementioned previous embodiment, in this embodiment too, a certain frictional force is provided between the rotary member 1 and the lens barrel 4. This is for controlling movement of the lens barrel 4, for example, by the normal direction rotation of the motor, and the movement of the drive member 10 of aperture mechanism 9 is done by the reverse direction rotation, through the frictional force between the rotary member 1 having said cam groove 13 and the lens barrel 4 having cam pin 14.

Therefore, in the similar way to the preceding embodiment, when the drive member 10 of the aperture mechanism 9 has reached the left side end 12a or right side end 12b of the moving groove 12 and the lens barrel 4 can no longer rotate, the rotary force of the rotary member 1 works to move the lens barrel 4 straightly ahead due to the engagement between the cam groove 13 and cam pin 14.

Figure 4:
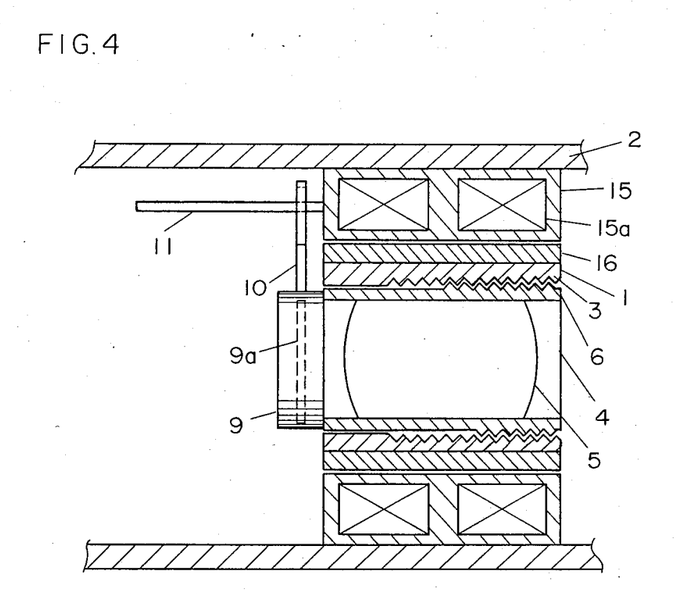
FIG. 4 is a sectional view of essential parts, including a partial side elevation, showing a different embodiment of a drive apparatus of lens and exposure mechanism by motor based on this invention.

FIG. 4 is a sectional view of essential parts, including a partial side elevation, showing another embodiment of the drive apparatus of this invention. As is clear from the description to follow, an example of controlling the moving action of the lens and aperture by one stepping motor.

In FIG. 4, the same reference numerals as used in FIGS. 1 and 2 refer to identical or corresponding members, wherein numeral 15 designates a hollow stator being affixed to the frame 2 of the optical lens apparatus and having a stator coil 15a inside thereof, and 16 designates a hollow rotor. The rotor 16 makes up a stepping motor together with said stator 15, being disposed inside the stator 15 at a shown position by, for example, a known bearing mechanism or the like, so as to be rotatable without being moved in the lateral direction in the drawing.

Inside the rotor 16 is affixed a rotary member 1 having a first threaded part 3, but in this embodiment, the rotary member 1 may be formed by the rotor 16 itself. In other words, it is enough when a rotation output means to deliver the rotary force of this rotor 16 is formed inside of the rotor 16, for example, the first threaded part 3 of FIG. 1 or the cam mechanism 15, 16 as explained in FIG. 3.

The rotor 16 has a hollow shape in the illustrated example, but it may be formed, for example, in a semicircular shape if the travel of the lens barrel 4 in the direction of optical axis is not so long.

The operation of the embodiment shown in FIG. 4, which is described in details below, is similar to that of the embodiment shown in FIG. 1, except the rotary force delivered by the stepping motor is directly supplied to the rotary member 1, without passing through the gear train 8. The fundamental control action of the lens barrel 4 and aperture mechanism 9 is identical.

When the stepping motor composed of stator 15 and rotor 16 runs to generate a rotary force in the rotor 16, this rotary force is transmitted to the lens barrel 4 and aperture mechanism 9 by way of the rotary member 1, first threaded part 3, and second threaded part 6.

As a result, as explained in the above embodiment, due to the friction between the first and second threaded parts 3 and 6, the first drive member 10 of the aperture mechanism 9 moves within the moving groove 12 up to the end part 12a or 12b, depending on the rotating direction of the rotor 16. And thereafter, the lens barrel 4 begins to move.

After stopping the operation of the stepping motor, by the signal from a known auto focus mechanism, lens barrel 4 or other position detecting mechanism, when it is operated again to put the rotor 16 in the reverse direction, the rotating force is transmitted to the aperture mechanism 9 and others in the similar route and thereby the drive member 10 moves within the moving groove 12, as mentioned in the above embodiment, up to the reverse end part 12b or 12a, without being accompanied by the movement of the lens barrel 4.

By stopping the operation of the stepping motor during the motion of the drive member 10, by means of the signal from a known exposure control device, or the like as mentioned in the above embodiment, a desired aperture value is set in the aperture mechanism 9. A shutter operation is done in this state, thereby achieving a photographic action.

In this embodiment, too, same as in the preceding embodiment, it is necessary to set the starting point of the lens barrel 4 at either the nearest point side or the farthest point side of photographing.

After such photographic action, when the rotor 16 is further rotated in the direction of rotation for setting the desired aperture value by controlling the aperture mechanism 9, the aperture drive member 10 abuts against the end part 12b or 12a of said moving groove 12. And thereafter, the rotary force of the rotor 16 moves the lens barrel 4 through the first and the second threaded parts 3 and 6, so that the apparatus returns to the initial state.

Figure 5:
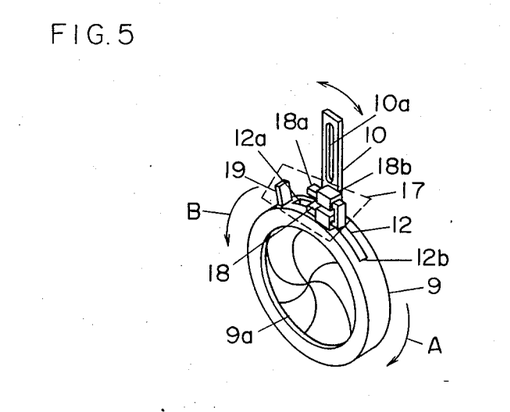
FIG. 5 is a perspective view showing an example of configuration of the aperture mechanism 9, which is an exposure mechanism used in FIG. 1, as an aperture shutter mechanism.

FIG. 5 is a perspective view showing an example of constituting the aperture mechanism 9, which is the exposure mechanism used in the two preceding embodiments as shutter mechanism 9'. In FIG. 5, a stopping mechanism 17 comprises an electromagnet 18 affixed to the drive member 10, which is for driving the blades 9a same as the exposure member for acting as the apertures in the preceding embodiments while acting as an aperture shutter in this embodiment. An attraction piece 19 is disposed in the vicinity of the end part 12a or 12b of the moving groove 12 of the main body of the aperture shutter mechanism 9'. Meanwhile the electromagnet 18 comprises a permanent magnet 18a and a coil 18b which is for cancelling magnetic force of the permanent magnet 18a by energization thereof.

Incidentally, the position of forming of the attraction piece 19 is limited to the vicinity of either end part of the moving groove 12. This is for the sake of thrusting and positioning the drive member 10 to keep the blades 9a in fully closed state, by means of the rotary force of the motor transmitted to the main body of the aperture shutter mechanism 9', in the setting operation to move the lens barrel 4 to a proper position.

Next, an embodiment capable of desirably controlling the motions of lens and aperture shutter with a single common motor 7 is described. Such an embodiment is made by applying the embodiment shown in FIG. 5 in FIGS. 1 and 4 and properly controlling the operation of said stopping mechanism 17, motor 7, and a stepping motor consisting of a stator 15 and a rotor 16.

For the convenience of explanation, it is provided that the aperture shutter mechanism 9' in FIG. 5 is applied in place of the aperture mechanism 9 of the embodiment shown in FIG. 1.

In the case of this embodiment, in the initial state, the coil 18b of the electromagnet 18 is not energized, and the drive member 10 is positioned at either end 12a or 12b of the moving groove 12, by being attracted to the attraction piece 19. In this state, however, the blades 9a are fully closed as mentioned above.

When the motor 7 is driven, its rotating force or torque is transmitted to the aperture shutter mechanism 9' by way of the gear train 8, rotary member 1, first and second threaded parts 3, 6, and lens barrel 4.

In the preceding embodiments, this rotating force acted to move the drive member 10. But in this embodiment, in the initial state, as mentioned above, the drive member 10 is already positioned at either one end of the moving groove 12 and the blades 9a are fully closed. This position is also the position of thrust at the time of setting operation of the lens barrel 4. Therefore, the lens barrel 4 begins to move immediately.

The lens barrel 4 is set in an adequate position when the motor 7 stops due to the signal from auto focus mechanism or the like.

When the shutter operation is started, first, the magnetic force of the permanent magnet 18a energized in the coil 18b of the electromagnet 18 is canceled, and the drive member 10 is ready to move relative to the main body of the aperture shutter mechanism 9'.

At the same time, the motor 7 is driven in the reverse direction as the time of position setting of the lens barrel 4 mentioned above.

The torque of the motor 7 is transmitted to the main body of the aperture shutter mechanism 9' by way of the rotary member 1 and others. This main body is then rotated by the existence of frictional force between the first and second threaded parts 3, 6 as was mentioned earlier. And the drive member 10 relatively moves in the moving groove 12. As a result, the blades 9a proceeds to open from the hitherto closed state.

In the process of opening of blades 9a or at an arbitrary point after reaching the fully open state, when a signal to set the adequate exposure state is received from the exposure control device or the like, the motor 7 is driven again in the reverse direction, and the power supply to the coil 18b of the electromagnet 18 is cut off.

When the motor is driven again in the reverse direction by the same extent as in the above opening operation, the drive member 10 moves relatively in the reverse direction of the above opening operation in the moving groove 12, and hence, the blade 9a return to the fully closed state. Such opening and closing action of the aperture shutter blades 9a may be used as the aperture shutter operation.

At this time, when the power supply to the coil 18b has been cut off as mentioned above, the permanent magnet 18a is attracted again to the attraction piece 19, and the drive member 10 is fixed to the main body of the aperture shutter mechanism 9'.

Finally, when the motor 7 is driven again in the reverse direction to the aforementioned position setting action of the lens barrel 4, the rotary force of the motor 7 is transmitted to the aperture shutter mechanism 9' by way of the rotary member 1 and others.

In this case, however, difference from the opening action above, the coil 18b of the electromagnet 18 is not energized, and the drive member 10 is affixed to the main body. Therefore, when the torque of the motor 7 is transmitted to the lens barrel 4 by way of the first and the second threaded parts 3 and 6, the permanent magnet 18a keeps attraction of the attraction piece 19, overcoming the frictional force between the first and second threaded parts 3 and 6. Therefore, the permanent magnet is attaching to the drive member 10, which is affixed to the main body by the stopping mechanism 17, and hence, the blades 9a keep the fully closed state, while the lens barrel 4 is moved in the reverse direction to the aforementioned setting operation.

Such moving action is the returning action to the initial state, and the motor 7 stops driving by detecting that the lens barrel 4 has reached the initial position.

Besides the above-mentioned embodiment wherein the embodiment of FIG. 5 is applied to the embodiment shown in FIG. 1, similar application is also applicable to the embodiment of FIG. 6(a)–(b).

That is, the drive member 10 moves in the direction of arrow B with respect to the main body. When it is provided that the blades 9a may be fully closed at this time, the same action and effect as shown in the embodiment in FIG. 5 may be expected, by energizing said electromagnet 22 at the time of shutter operation to attact the detect lever 20 to rotate around the pin 21, hence to cancel the movement arrested state to the main body of the drive member 10 by its end part 20a.

In FIG. 7(a) to (d), the same reference numbers as given in FIG. 2 refer to the same or corresponding members of identical function. A guide pin 23 is a pin of an elastic substance made such as of leaf spring, and its lower end tip can flexibly go up and down but it has rigidity in circumferencial direction of the main body of the aperture shutter mechanism 9'.

Figure 7:
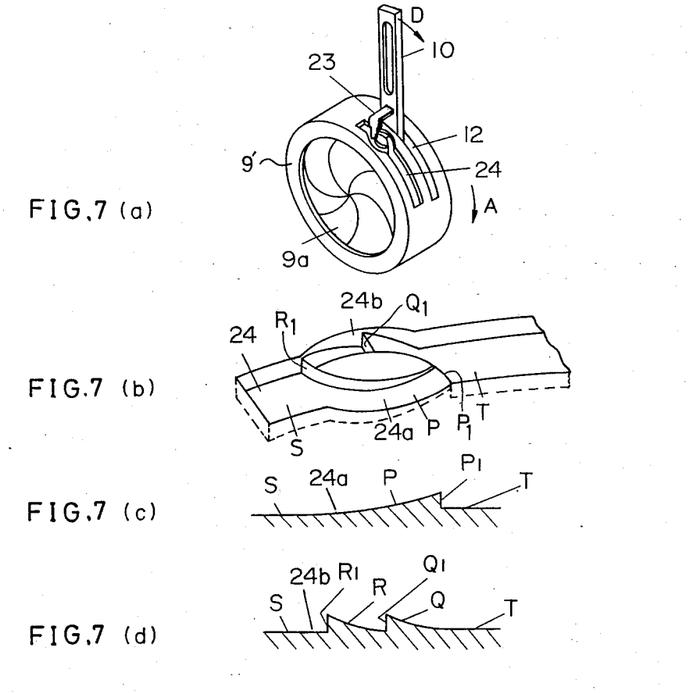

Numeral 24 is a one way latchet loop-course guide groove which is provided on the main body of the aperture shutter mechanism 9', and wherein the lower end tip of the guide pin 23 travels. The one way latchet loop-course guide groove 24 has a special loop part comprising two oppositely arc-shaped grooves 24a, 24b in one part thereof. Enlarged perspective view of the two grooves is shown in FIG. 7(b) and sections of the arc-shaped groove 24a and 24b are schematically and developed by shown in FIG. 7(c) and (d), respectively. The groove 24a possesses wall P1 on two fundamental faces S and T and also face P having a latchet step, while the groove 24b possesses walls Q1, R1 on faces S and T and also faces Q and R having two latchet steps.

Accordingly, as the drive member 10 moves in the clockwise or counterclockwise direction with respect to the main body, the guide pin 23 passes, for example, from face S to face T by way of the groove 24a; and from face T to face S by way of the groove 24b.

The apparatus is constituted as follows:

During the position setting action of the lens barrel 4 of FIG. 1, the rotating force transmitted to the aperture shutter mechanism 9' is in the clockwise direction of arrow A. At that time, the quide pin 23 is located at the face S. Then, the blades 9a begin to open only when the guide pin 23, namely the driving member 10, travels clockwise in the direction of arrow D in relation to the main body. At that time the guide pin 23 enters face T and thereafter moves farther in the direction of arrow D, due to the clockwise movement of the drive member 10 with respect to the main body. Furthermore, the position of the guide pin 23 upon completion of fully closing action in shutter operation is made to reach face R. That is, at the time of returning to the initial state, the guide pin 23 is abutting against the wall Q1 when the lens barrel 4 returns to the initial position.

Figure 6:
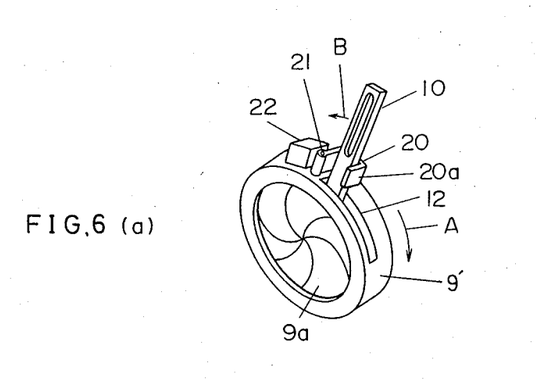

As a result of the above-mentioned configuration, similarly to the examples shown in FIGS. 5 and 6, the movements of the lens and aperture shutter can be controlled by one motor, without particular electromagnet device.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A drive apparatus of lens and exposure mechanism by a motor comprising:
   a motor as a drive source which rotates both in normal direction and reverse direction,
   a rotary member mounted on a frame of an optical lens appratus,
   transmission means for transmitting rotating force of said motor to said rotary member,
   a lens barrel which holds the lens and is disposed at a specified position inside said rotary member,
   force-direction conversion means for converting operating direction, being disposed between said rotary member and lens barrel to transmit the rotating motion of said rotary member to said lens barrel through a predetermined frictional force, making said lens barrel move linearly,
   an exposure mechanism affixed to said lens barrel, having a drive member which causes plural blade members provided inside the main body open and close by moving thereof, and
   a protruding member which projects from said frame and is engaged with said drive member in a manner to allow a linear motion of said lens barrel in the direction parallel to optical axis of said lens and to prohibit rotation of said drive member around said optical axis,
   whereby said lens barrel is moved to a predetermined position, together with said exposure mechanism, by the rotation of said motor in a predetermined direction, and said drive member of said exposure mechanism is moved to a predetermined position by a rotation in the reverse direction of said motor.

2. A drive apparatus of lens and exposure mechanism by a motor, in accordance with claim 1, wherein
   said exposure mechanism is an aperture which is to be driven by providing said specified position and by making rotation in the reverse direction to said predetermined direction of the motor.

3. A drive apparatus of lens and exposure mechanism by a motor, in accordance with claim 1, wherein
   said exposure mechanism is an aperture shutter and said aperture shutter comprises:
   an engaging mechanism which is energized in a manner to lock said aperture shutter in fully closed state by the rotation in said predetermined direction of said motor and deenergized thereby to release said locking of said aperture shutter and further is made to arrest a movement of the drive member with respect to the main body of said exposure mechanism and to release said arresting when said lens barrel moves to a specified position;
   whereby said exposure mechanism opens and closes at the time of said releasing of arresting, by the rotations of said motor in the reverse direction to said predetermined direction and again in said predetermined direction.

4. A drive apparatus of lens and exposure mechanism by a motor, in accordance with claim 3, wherein said stopping mechanism comprises an electromagnet which is affixed to the drive member of the exposure mechanism which has a permanent magnet and a coil for offsetting the magnetic force of said permanent magnet when energized, and, an attraction piece which is to be attracted to said permanent magnet when said coil is not energized, being disposed in the vicinity of the position where the main body of the exposure mechanism is energized to make the drive member maintains the exposure member in fully closed state when the lens barrel moves to the predetermined position.

5. A drive apparatus of lens and exposure mechanism by a motor, in accordance with claim 3, wherein said stopping mechanism comprises an electromagnet disposed in the vicinity of the fully closed position where the main body of the exposure mechanism is energized to make the drive member maintains the exposure member in fully closed state when the lens barrel moves to the specified position, and a detent lever located in the vicinity of said electromagnet on the main body which usually gets into the moving route of the drive member into the main body to arrest the drive member in said fully closed position, and release it from the moving route when attracted to the electromagnet due to energization.

6. A drive apparatus of lens and exposure mechanism by a motor, in accordance with claim 1, wherein said force-direction conversion means comprises a first energized part disposed in the inner side of the rotary member and a second energized part disposed in the outer side of the lens barrel to be engaged with said first part position.

7. A drive apparatus of lens and exposure mechanism by a motor, in accordance with claim 1, wherein said force-direction conversion means comprises a cam groove formed in said rotary member and a cam pin which is disposed on the outer side of said lens barrel and can slide within said cam groove.

8. A drive apparatus of lens and exposure mechanism by a motor comprising:
   a hollow stator which is affixed to a frame in an optical lens apparatus,
   a hollow rotor which is rotatably held inside said stator to constitute said motor together with said stator,
   rotating force output means which has a first threaded part inside said rotor for delivering the rotating force of said rotor,
   a lens barrel which comprises a lens set to be moved and a second threaded part on the outer side thereof for engagement with said first threaded part,
   an exposure mechanism which is affixed to said lens barrel and has a drive member to be driven for open and close exposure blades provided inside of the main body, said drive member projecting out of said main body, and
   a protruding member which projects from said frame and is engaged with said drive member in a manner to allow a linear motion of said lens barrel in the direction parallel to optical axis of said lens and to prohibit rotation of said drive member around said optical axis,
   whereby said lens barrel is moved to a predetermined position, together with said exposure mechanism, by the rotation of said motor in a predetermined direction, and said drive member of said exposure mechanism is moved to a predetermined position by a rotation in the reverse direction of said motor.

9. A drive apparatus of lens and exposure mechanism by a motor, in accordance with claim 8, wherein
   said exposure mechanism is an aperture which is to be driven by providing said drive member in a specified position and by making a rotation in the reverse direction to said predetermined direction of the motor.

10. A drive apparatus of lens and exposure mechanism by a motor, in accordance with claim 8, wherein said exposure mechanism is an aperture shutter and said drive apparatus comprises an engaging mechanism which is energized in a manner to lock said aperture shutter in fully closed state by the rotation in said predetermined direction of said motor and deenergized thereby to release said locking of said aperture shutter and further is made to arrest a movement of the drive member with respect to the main body of said exposure mechanism and to release said arresting when said lens barrel moves to a specified position; whereby said exposure mechanism opens and closes at at the time of said releasing of arresting, by the rotations of said motor in the reverse direction to said predetermined direction and again in said predetermined direction.

11. A drive apparatus of lens and exposure mechanism by motor, in accordance with claim 10, wherein said engaging mechanism comprises an electromagnet which is affixed to the drive member of the exposure mechanism which has a permanent magnet and a coilfor offsetting the magnetic force of said permanent magnet when energized, and an attraction piece which is to be attracted to said permanent magnet when said coil is not energized, being disposed in the vicinity of the position where the main body of the exposure mechanism is energized to make the drive member maintains the exposure member in fully closed state when the lens barrel moves to the predetermined position.

12. A drive apparatus of lens and exposure mechanism by a motor, in accordance with claim 10, wherein said engaging mechanism comprises an electromagnet disposed in the vicinity of the fully closed position where the main body of the exposure mechanism is energized to make the drive member maintains the exposure member in fully closed state when the lens barrel moves to the specified position, and a detent lever located in the vaicinity of said electromagnet on the main body which usually gets into the moving route of the drive mbmer into the main body to arrest the drive member in said fully closed position, and release it from the moving route when attracted to the electromagnet due to energization.

13. A drive apparatus of lens and exposure mechanism by a motor, in accordance with claim 8, wherein said rotating force output means is affixed to said rotor at inside thereof, being aspiral thread formed on inside face of hollow space in said hollow rotor.

14. A drive apparatus of lens and exposure mechanism by a motor, in accordance with any one of claims 1, 3, 4, 5, 6, 7, 8, 10, 11, 12 or 13 wherein said stopping means comprises a one-way latchet loop groove consisting of two arc-shaped grooves formed on outer face of said main body of said exposure mechanism, each arc-shaped groove having a backward-prohibition step at the end thereof and one of said arc-shaped groove having an intermediate backwardprohibition step to make the exposure mechanism retained in closed state when the lens is driven to restore to the initial state, and a sliding pin which has a sliding end tip which is slidably held in said one-way latchet loop groove.

* * * * *

UNITED STATES PATENT AND TRADEMARK OFFICE
CERTIFICATE OF CORRECTION

PATENT NO.   : 4,695,144

DATED        : September 22, 1987

INVENTOR(S) : YOSHINO, et al.

It is certified that error appears in the above-identified patent and that said Letters Patent is hereby corrected as shown below:

In the Heading:

[30]  Foreign Application Priority Data

Aug. 24, 1985 [JP]    Japan ................60-186132
Aug. 24, 1985 [JP]    Japan ................60-186131

Signed and Sealed this

Twentieth Day of December, 1988

Attest:

DONALD J. QUIGG

Attesting Officer

Commissioner of Patents and Trademarks